US00RE41014E

(19) United States
(12) Reissued Patent
Anderson

(10) Patent Number: US RE41,014 E
(45) Date of Reissued Patent: Nov. 24, 2009

(54) SYSTEM AND METHOD FOR PREVENTING DAMAGE TO MEDIA FILES WITHIN A DIGITAL CAMERA DEVICE

(75) Inventor: Eric C. Anderson, Gardnerville, NV (US)

(73) Assignee: Apple Inc., Cupertino, CA (US)

(21) Appl. No.: 10/622,673

(22) Filed: Jul. 17, 2003

Related U.S. Patent Documents

Reissue of:
(64) Patent No.: 6,263,453
Issued: Jul. 17, 2001
Appl. No.: 09/301,869
Filed: Apr. 29, 1999

U.S. Applications:
(63) Continuation of application No. 08/716,773, filed on Sep. 24, 1996, now Pat. No. 5,935,259.

(51) Int. Cl.
*G06F 11/00* (2006.01)

(52) U.S. Cl. ..... 714/22; 714/14; 714/24; 713/340

(58) Field of Classification Search ..... 714/22, 714/14, 18; 713/340, 300; 348/187, 175
See application file for complete search history.

(56) References Cited

U.S. PATENT DOCUMENTS

| | | | | |
|---|---|---|---|---|
| 4,323,987 | A | | 4/1982 | Holtz et al. |
| 4,658,352 | A | | 4/1987 | Nagasawa |
| 4,763,333 | A | | 8/1988 | Byrd |
| 5,079,585 | A | | 1/1992 | Yamada |
| 5,283,792 | A | | 2/1994 | Davies, Jr. et al. |
| 5,475,441 | A | | 12/1995 | Parulski et al. |
| 5,477,264 | A | | 12/1995 | Sarbadhikari et al. |
| 5,493,335 | A | | 2/1996 | Parulski et al. |
| 5,664,089 | A | | 9/1997 | Byers et al. |
| 5,790,878 | A | | 8/1998 | Anderson et al. |
| 5,935,259 | A | | 8/1999 | Anderson |
| 6,126,332 | A | * | 10/2000 | Cubbage et al. ..... 710/2 |

* cited by examiner

*Primary Examiner*—Dieu-Minh Le
(74) *Attorney, Agent, or Firm*—Fenwick & West LLP

(57) ABSTRACT

A system and method for preventing damage to media files within a digital camera comprise a power manager for detecting power failures, an interrupt handler for responsively incrementing a counter device and a removable memory driver for performing memory access operations, evaluating the counter device to determine whether a power failure has occurred during the memory access operation and for repeating the memory access operation whenever a power failure has occurred during the memory access operation.

32 Claims, 9 Drawing Sheets

SYSTEM AND METHOD FOR PREVENTING DAMAGE TO MEDIA FILES WITHIN A DIGITAL CAMERA DEVICE

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation of application Ser. No. 08/716,773 filed Sep. 24, 1996 entitled "System And Method For Preventing Damage To Media Files Within A Digital Camera Device"; now U.S. Pat. No. 5,935,259. This application is hereby incorporated by reference. This application also relates to co-pending U.S. patent application Ser. No. 08/666,241, entitled "System And Method For Using A Unified Memory Architecture To Implement A Digital Camera Device," filed on Jun. 20, 1996; and also to U.S. Pat. No. 5,790,878, entitled "System And Method For Recovering From A Power Failure Within A Digital Camera Device," issued on Aug. 4, 1998, both of which are hereby incorporated by reference.

BACKGROUND OF THE INVENTION

1. Field of the Invention

This invention relates generally to digital cameras and more particularly to a system and method for preventing power failure damage to media files within a digital camera device.

2. Description of the Background Art

Modern photographic technology presently includes a variety of digital camera devices which capture image data by electronically scanning selected target objects. Digital camera devices often process and compress the captured image data before storing the processed image data into internal or external memory devices. These memory devices typically include various types of nonvolatile memory which are accessed in read/write operations that store and access captured image data.

Protecting the captured image data during the memory access operations is an important consideration of both camera manufacturers and camera users. Camera designers must therefore anticipate the occurrence of any events which might endanger the integrity of the captured image data.

A power failure during a memory read/write operation within a digital camera device is one example of an event which might seriously jeopardize image data. For example, the digital camera may be accessing a file, rewriting a file directory or rewriting a file allocation table at the time a power failure occurs. The intervening power failure may prevent the successful completion of the memory access operation and thus damage integrity of the image data.

Further, a power failure may interrupt various camera memory functions which typically resume their respective tasks whenever power is restored to the digital camera. The interrupted functions, however, would be unaware that a power failure had intervened. The interrupted memory functions would thus be unaware of the hardware reset which results from reapplying power after the power failure. This confusion between the system software and hardware would potentially endanger camera operations. For the foregoing reasons, an improved system and method is needed for preventing damage to media files within a digital camera device according to the present invention.

SUMMARY OF THE INVENTION

In accordance with the present invention, a system and method are disclosed for preventing damage to media files within a digital camera device. The preferred embodiment of the present invention includes a central processing unit, a powerfail counter, a removable memory driver, a first-level interrupt handler, various interrupt service routines, a power manager and a voltage sensor.

In the preferred embodiment, the first-level interrupt handler initially sets the powerfail counter to a value of zero. Various interrupt service routines (each corresponding to a specific camera function or operation) may register themselves with the first-level interrupt handler (which coordinates all interrupts within the digital camera) to receive notification of an intervening power failure. Alternately, each interrupt service routine may receive a unique interrupt directly, via some form of vector interrupt mechanism or by using a hard-coding methodology.

The power manager monitors the voltage sensor to detect a power failure within the digital camera. After detecting a power failure in which the camera operating power is less than a specified threshold value, the power manager generates a powerfail interrupt. The central processing unit responsively performs a powerfail powerdown sequence to preserve image data contained within the digital camera at the time of the intervening power failure. The power manager removes operating power from all non-critical subsystems and switches the critical subsystems to a backup power supply. The central processing unit and the camera's volatile memory are thus maintained in a static low-power mode, with all states preserved intact.

After the power failure is remedied, the central processing unit performs a restart sequence to preserve any stored image data and to return the digital camera to a normal operational mode. In the preferred embodiment, the first-level interrupt handler increments the powerfail counter to record the intervening power failure. The first level interrupt handler then notifies the registered interrupt service routines about the power failure restart and corresponding hardware reset.

In alternate embodiments, the interrupt service routines may operate in cooperation with various other system routines. These cooperating routines thus may form various hierarchical networks which operate in synchronous or asynchronous modes. For example, a particular interrupt service routine may function in response to a device driver. The device driver, in turn, may function in response to an application program. In such cases, the interrupt service routines typically propagate their received power failure notification to any related routines in the network which require notification of the power failure restart.

In the normal operational mode, the digital camera periodically performs a memory access operation which requires successful completion. To ensure that a memory access operation is completed without an intervening power failure, the removable memory driver preferably reads the powerfail counter prior to performing a memory access operation to obtain a pre-operation value. After performing the memory access operation, the removable memory driver again reads the powerfail counter to obtain a post-operation value. The removable memory driver then compares the pre-operation value and the post-operation value, and repeats the memory access operation if the pre-operation value and the post-operation value are different. The present invention thus preserves the integrity of captured image data and effectively prevents damage to media files in the digital camera device.

DETAILED DESCRIPTION OF THE PREFERRED EMBODIMENT

The present invention discloses a system and method for preventing damage to media files within a digital camera device and comprises a power manager for detecting power failures, an interrupt handler for responsively incrementing a counter device and a removable memory driver for performing memory access operations, evaluating the counter device to determine whether a power failure has occurred during the memory access operation and for repeating the memory access operation whenever a power failure has occurred during the memory access operation.

Figure 1:
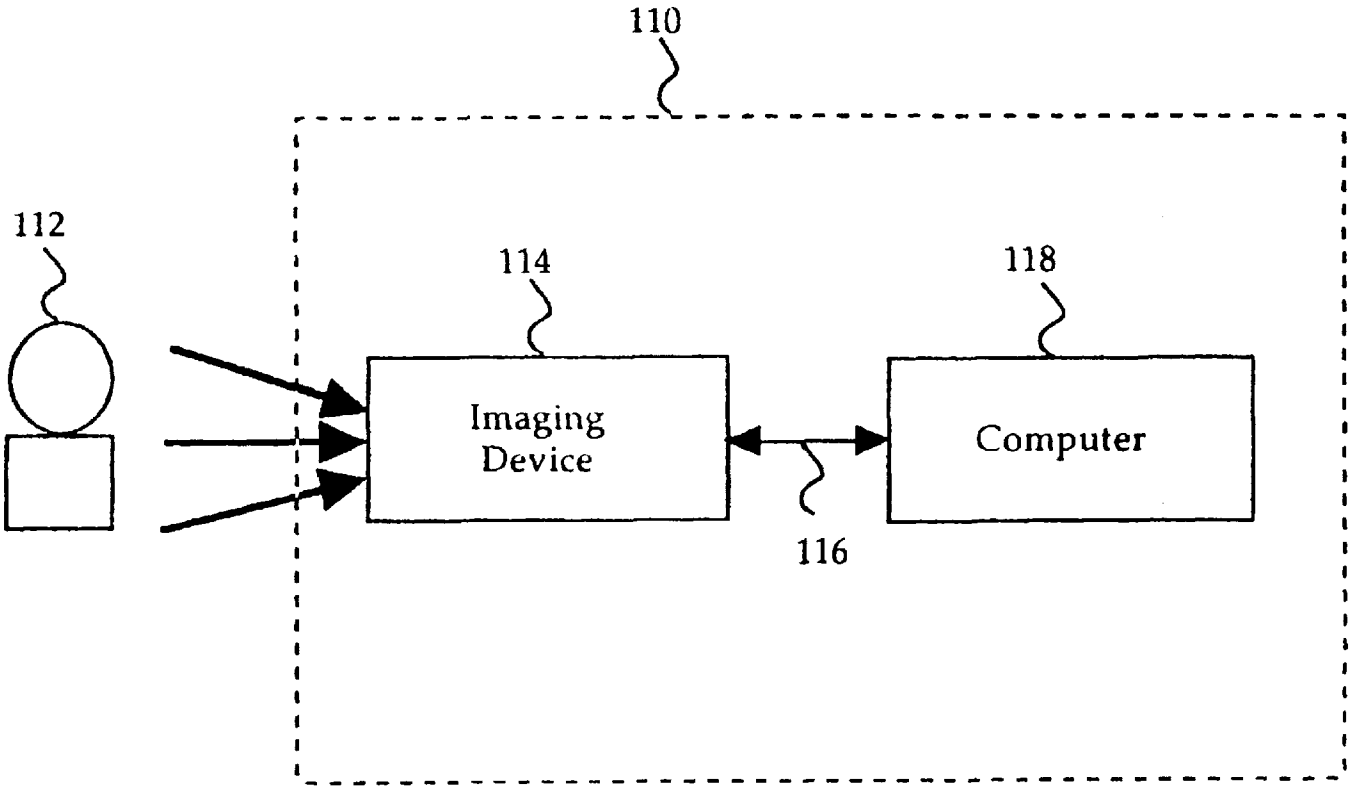
FIG. 1 is a block diagram of a digital camera according to the present invention.

Referring now to FIG. 1, a block diagram of a camera 110 is shown according to the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
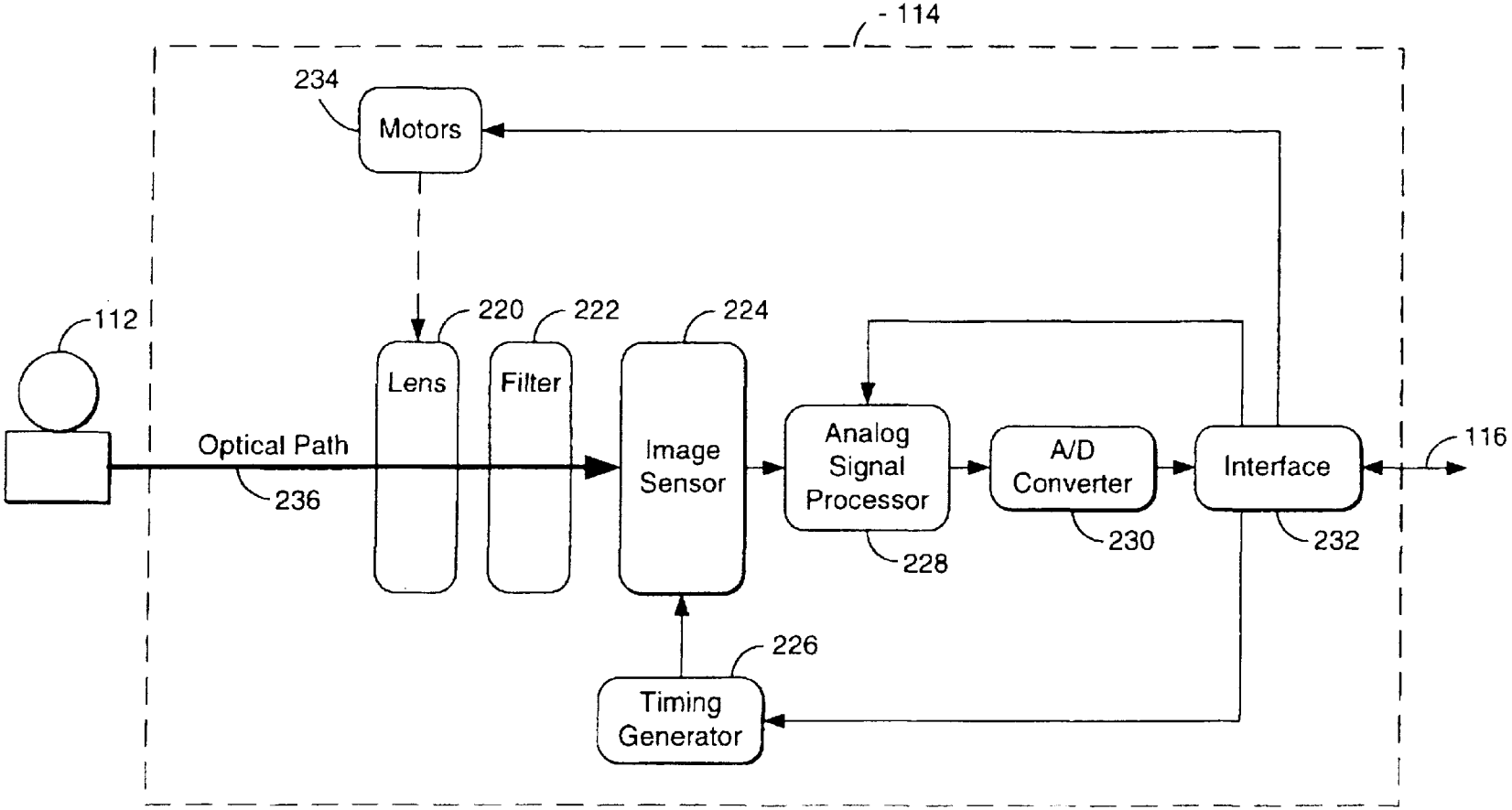
FIG. 2 is a block diagram of the preferred embodiment for the imaging device of FIG. 1.

Referring now to FIG. 2, a block diagram of the preferred embodiment of imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motors 234.

U.S. Pat. No. 5,496,106, entitled "A System and Method For Generating a Contrast Overlay as a Focus Assist for an Imaging Device," issued on Mar. 5, 1966, is incorporated herein by reference, and provides a detailed discussion of the preferred elements of imaging device 114. Briefly, imaging device 114 captures an image of object 112 via reflected light impacting image sensor 224 along optical path 236. Image sensor 224 responsively generates a set of raw image data representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
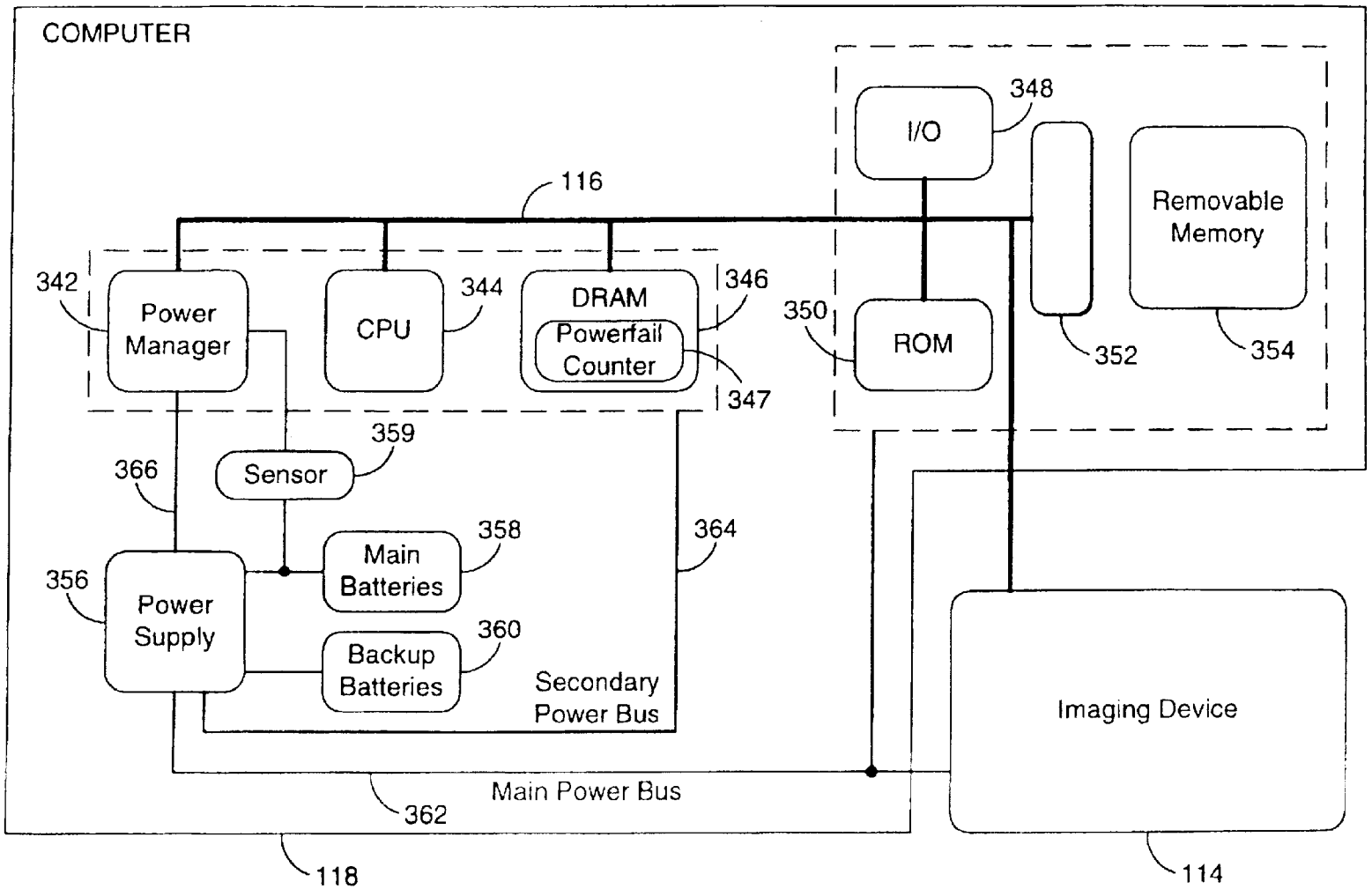
FIG. 3 is a block diagram of the preferred embodiment for the computer of FIG. 1.

Referring now to FIG. 3, a block diagram of the preferred embodiment for computer 118 is shown. System bus 116 provides connection paths between imaging device 114, power manager 342, central processing unit (CPU) 344, dynamic random-access memory (DRAM) 346, input/output interface (I/O) 348, read-only memory (ROM) 350, and connector 352. In the preferred embodiment, removable memory 354 may also connect to system bus 116 via connector 352.

Power manager 342 communicates via line 366 with power supply 356 and coordinates power management operations for camera 110 as discussed below in conjunction with FIGS. 6–9. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions by computer 118. DRAM 346 includes a powerfail counter 347 which is incremented each time a power failure occurs in power supply 356. DRAM 346 and powerfail counter 347 are further discussed below in conjunction with FIGS. 5–9.

I/O 348 is an interface device allowing communications to and from computer 118. For example, I/O 348 permits an external host computer (not shown) to connect to and communicate with computer 118. I/O 348 also permits a camera 110 user to communicate with camera 110 via a set of externally-mounted user controls and via an external LCD display panel. ROM 350 typically comprises a conventional nonvolatile read-only memory which stores a set of computer-readable program instructions to control the operation of camera 110. ROM 350 is further discussed below in conjunction with FIG. 4. Removable memory 354 serves as an additional image data storage area and is preferably a non-volatile device, readily removable and replaceable by a camera 110 user via connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, ROM 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364.

During a power failure mode in which the main batteries 358 have failed (when their output voltage has fallen below a minimum operational voltage level) the backup batteries 360 provide operating power to power supply 356 which then provides the operating power only to the secondary power bus 364 of camera 110. Selected components of camera 110 (including DRAM 346) are thus protected against a power failure in the main batteries 358.

Power supply 356 preferably also includes a flywheel capacitor connected to the power line coming from the main batteries 358. If the main batteries 358 suddenly fail, the flywheel capacitor temporarily maintains the voltage from the main batteries 358 at a sufficient level, so that computer 118 can protect any image data currently being processed by camera 110 before shutdown occurs.

Voltage sensor 359 detects the voltage supplied by main batteries 358 and responsively provides the detected voltage reading to power manager 342. The operation of power manager 342, power supply 356 and voltage sensor 359 are further discussed below in conjunction with FIGS. 6–8.

Figure 4:
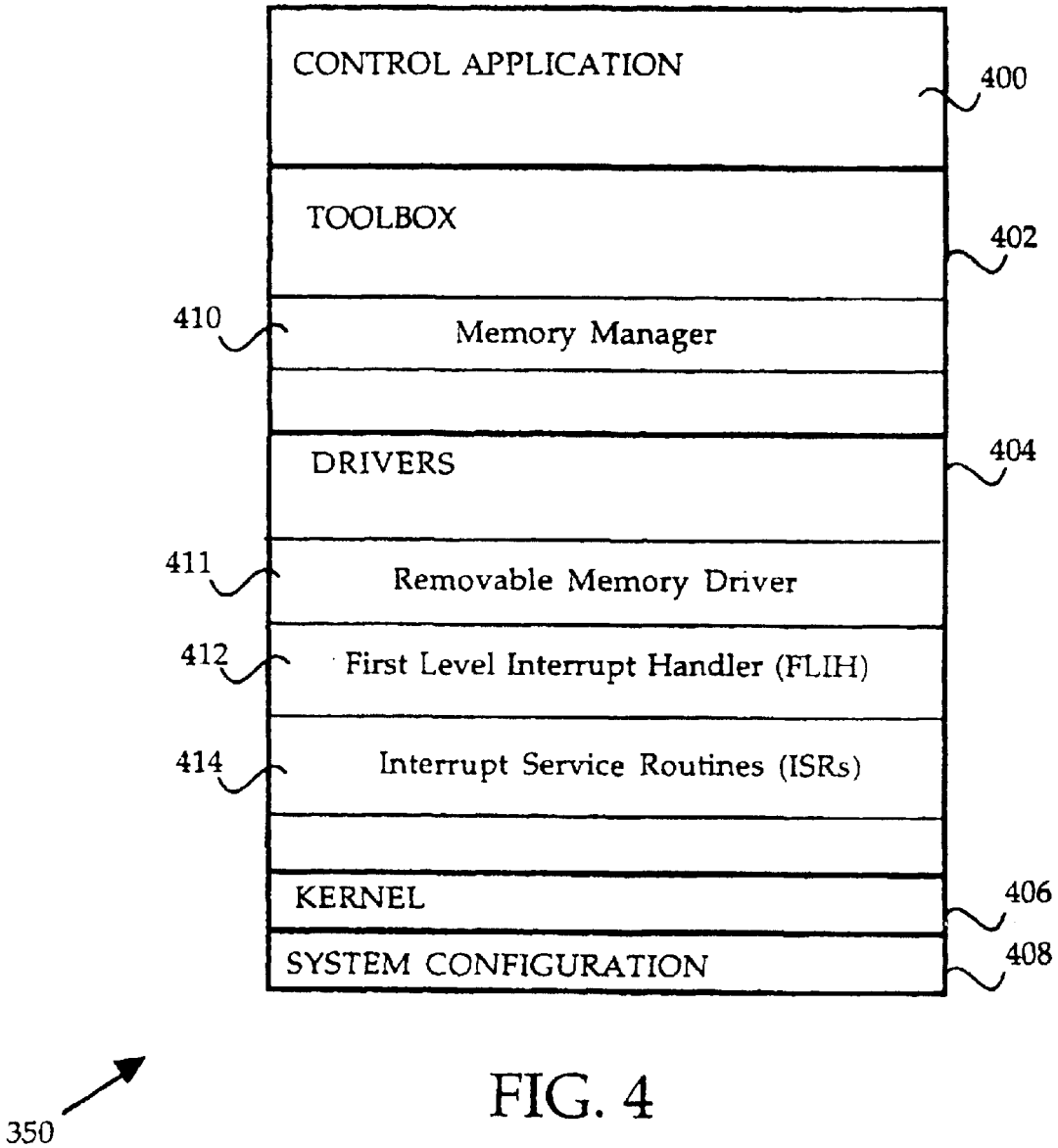
FIG. 4 is a block diagram showing the preferred embodiment of the Read-Only Memory of FIG. 3.

Referring now to FIG. 4, a memory map showing the preferred embodiment of read-only memory (ROM) 350 is shown. In the preferred embodiment, ROM 350 includes control application 400, toolbox 402, drivers 404, kernel 406 and system configuration 408. Control application 400 comprises program instructions for controlling and coordinating the various functions of camera 110. Toolbox 402 contains selected function modules including memory manager 410 which is controlled by control application 400 and responsively allocates DRAM 346 storage locations depending upon the needs of computer 118 and the sets of received image data.

Drivers 404 control various components of camera 110 and include removable memory driver 411, a first level interrupt handler (FLIH) 412 and various interrupt service routines (ISRs) 414. In the preferred embodiment, removable memory driver 411 is a routine which controls and coordinates the operation of removable memory 354. Removable memory driver 411 is further discussed below in conjunction with FIG. 9. FLIH 412 is preferably a software routine which coordinates all interrupts within camera 110. FLIH 412 typically handles ordinary non-critical interrupts and also handles non-maskable critical interrupts such as a power failure in main batteries 358. FLIH 412 preferably communicates with the various ISRs 414 which are each designed to handle a specific corresponding interrupt within camera 110. FLIH 412 notifies the appropriate ISRs 414 via a "signal" when the interrupts occur. A signal is a mechanism used by multi-tasking operating systems for interprocess communications and synchronization.

For example, a camera 110 user may request zoom motor 234 to perform a zoom operation using lens 220. When the requested zoom process is complete, an interrupt is generated to indicate that zoom motor 234 and lens 220 have reached their destination positions. The particular ISR 414 which corresponds to the foregoing zoom process then responsively handles the generated interrupt and provides a status update to higher-level routines, if necessary. In preferred embodiment, kernel 406 provides a range of basic underlying services for the camera 110 operating system. System configuration 408 performs initial start-up routines for camera 110, including the boot routine and initial system diagnostics.

Figure 5:
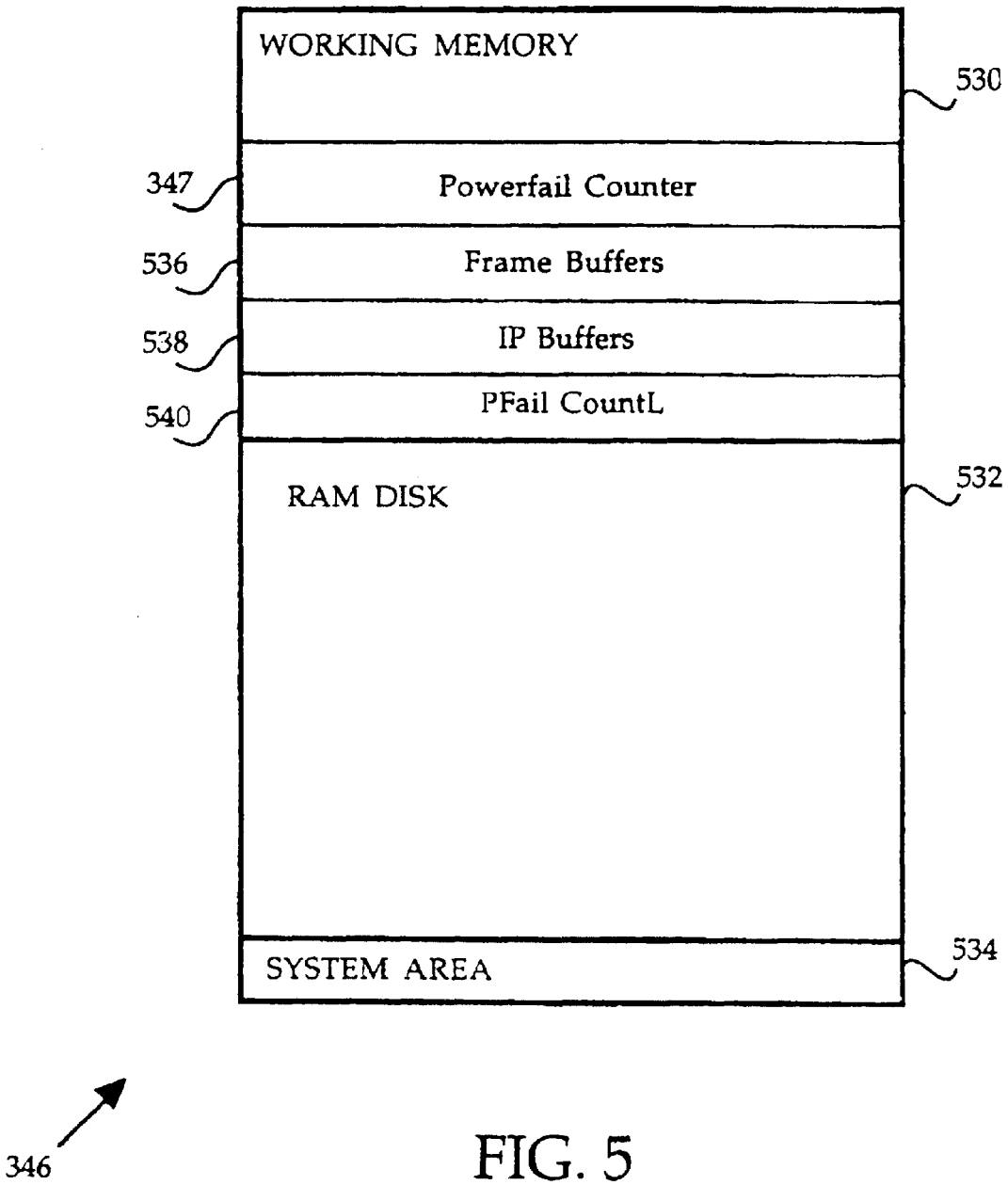
FIG. 5 is a block diagram showing the preferred embodiment of the Dynamic Random-Access Memory of FIG. 3.

Referring now to FIG. 5, a memory map showing the preferred embodiment of dynamic random-access memory (DRAM) 346 is shown. In the preferred embodiment, DRAM 346 includes working memory 530, RAM disk 532 and system area 534. Working memory 530 includes a powerfail counter 347, frame buffers 536 (for initially storing sets of raw image data received from imaging device 114), image processing (IP) buffers 538 (for temporarily storing image data during the image processing and compression 420 process), and Pfail CountL 540. In the preferred embodiment, power fail counter 347 stores a value which first-level interrupt handler 412 preferably increments each time voltage sensor 359 detects a power failure in main batteries 358. Pfail CountL 540 may selectively be used to store a local copy of the current value of powerfail counter 347, according to the present invention. Powerfail counter 347 and Pfail CountL 540 are further discussed below in conjunction with FIGS. 6–9. Working memory 530 may also contain various stacks, data structures and variables used by CPU 344 while executing the software routines used within computer 118.

RAM disk 532 is a memory area used for storing raw and compressed image data and typically is organized in a "sectored" format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Figure 6:
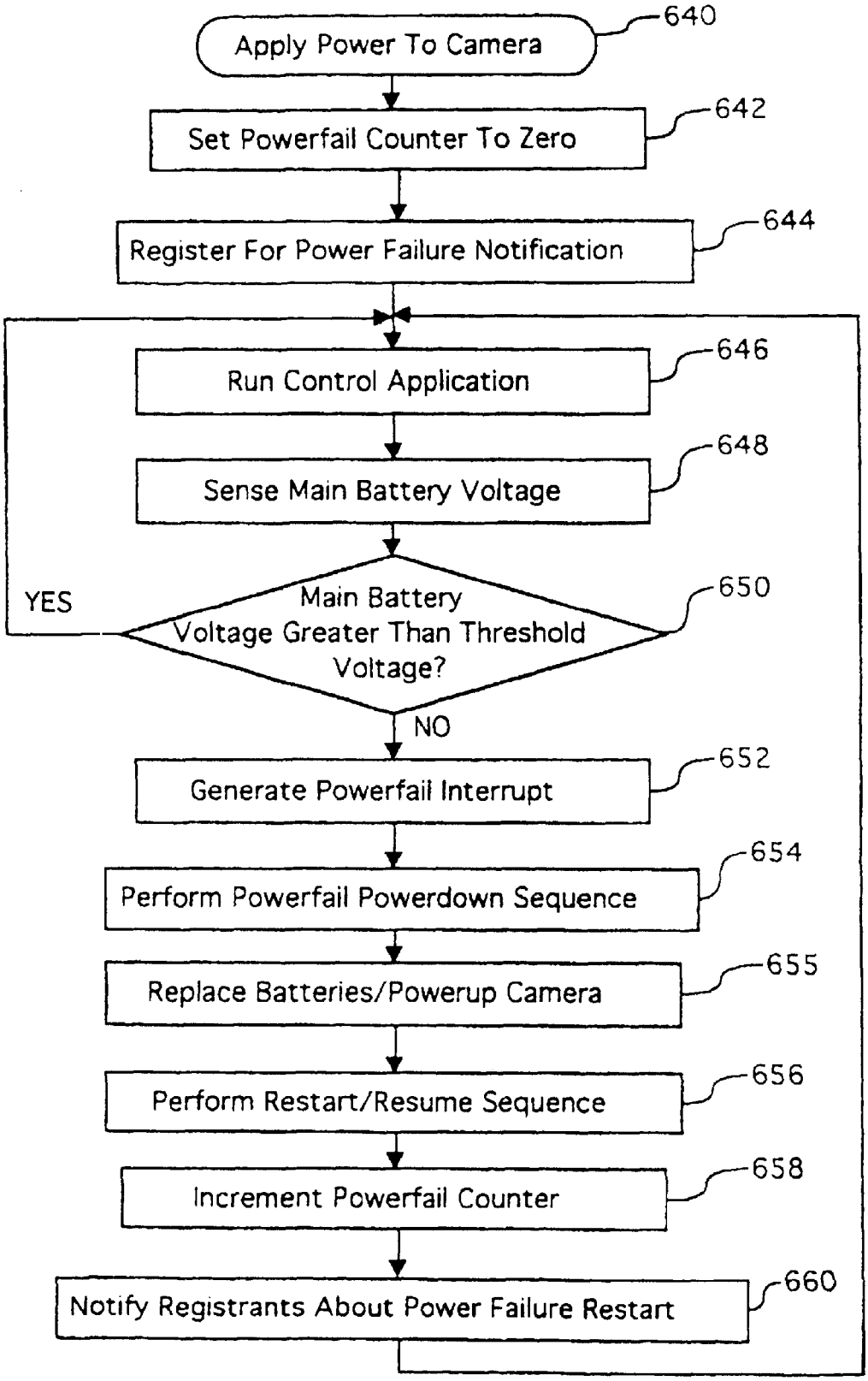
FIG. 6 is a flowchart of preferred general method steps for recovering from a power failure according to the present invention.

Referring now to FIG. 6, a flowchart of preferred general method steps for recovering from a power failure is shown. Initially, a user applies 640 power to camera 110 by installing main batteries 358 and backup batteries 360, and then activating an externally-mounted power on-off switch. First-level interrupt handler (FLIH) 412 then sets 642 powerfail counter 347 to a value of zero. Next, various interrupt service routines 414 register 644 with the first level interrupt handler 412 to request notification in the event of a power failure in main batteries 358.

CPU 344 then runs 646 control application 400 to operate camera 110 in normal operation mode which captures, processes, compresses and stores sequential sets of image data. In normal operation mode, CPU 344 periodically requests the execution of various critical processes. In the preferred embodiment, CPU 344 repeatedly checks powerfail counter 347 to determine whether a critical process has been interrupted by an intervening power failure. This process of using powerfail counter 347 to ensure the successful execution of critical processes is further discussed below in conjunction with FIG. 9.

Next, voltage sensor 359 senses 648 the voltage level of main batteries 358 and provides power manager 342 with the sensed voltage level. Power manager 342 then determines 650 whether the voltage level of main batteries 358 is greater than a predetermined threshold voltage level. The threshold value is typically selected to be incrementally higher that the minimum operating voltage (to permit orderly shutdown of the camera 110 processes). If the voltage of main batteries 358 is greater than the selected threshold value, then the FIG. 6 process repeats the steps 646, 648 and 650.

However, if the voltage of main batteries 358 is not greater 650 than the predetermined threshold value, then power manager 342 generates 652 a powerfail interrupt. In the preferred embodiment, the powerfail interrupt may be disabled in rare cases in which a sequence of CPU 344 instructions must never be interrupted by a power failure. Any disabling of the powerfail interrupt, however, is restricted to a very short period of time. Next, CPU 344 receives the generated powerfail interrupt and responsively performs 654 a powerfail powerdown sequence to protect the image data currently within camera 110. The powerfail powerdown sequence is further discussed below in conjunction with FIG. 7.

The camera 110 user may then replace 655 the main batteries 358 and activate the camera 110 power on/off switch. CPU 344 then performs 656 a restart/resume sequence to bring camera 110 back to normal operating mode while also preserving any existing image data. FLIH 412 then increments 658 powerfail counter 347 to indicate the occurrence of a power failure in main batteries 358. Alternately, powerfail counter 347 may be a hardware register which is incremented in power manager 342.

The first level interrupt handler 412 then notifies 660 any registered interrupt service routines 414 about the power failure restart so that the interrupt service routines 414 are aware that their corresponding hardware components have been reset by the power failure and the subsequent camera 110 powerup. The power failure notification allows the registered interrupt service routines 414 to run depending upon their relative task priority. Typically, this notification is accomplished through the use of a signal or semaphore which wakes up the interrupt service routine.

In alternate embodiments, the interrupt service routines may operate in cooperation with various other system routines. These cooperating routines thus may form various hierarchical networks which operate in synchronous or asynchronous modes. For example, a particular interrupt service routine may function in response to a device driver. The device driver, in turn, may function in response to an application program. In such cases, the interrupt service routines typically propagate their received power failure notification to any related routines in the network which require notification of the power failure restart. Finally, the FIG. 6 process then returns to step 646 and CPU 344 runs control application 400 to operate camera 110 in normal operation mode, as discussed above.

Figure 7:
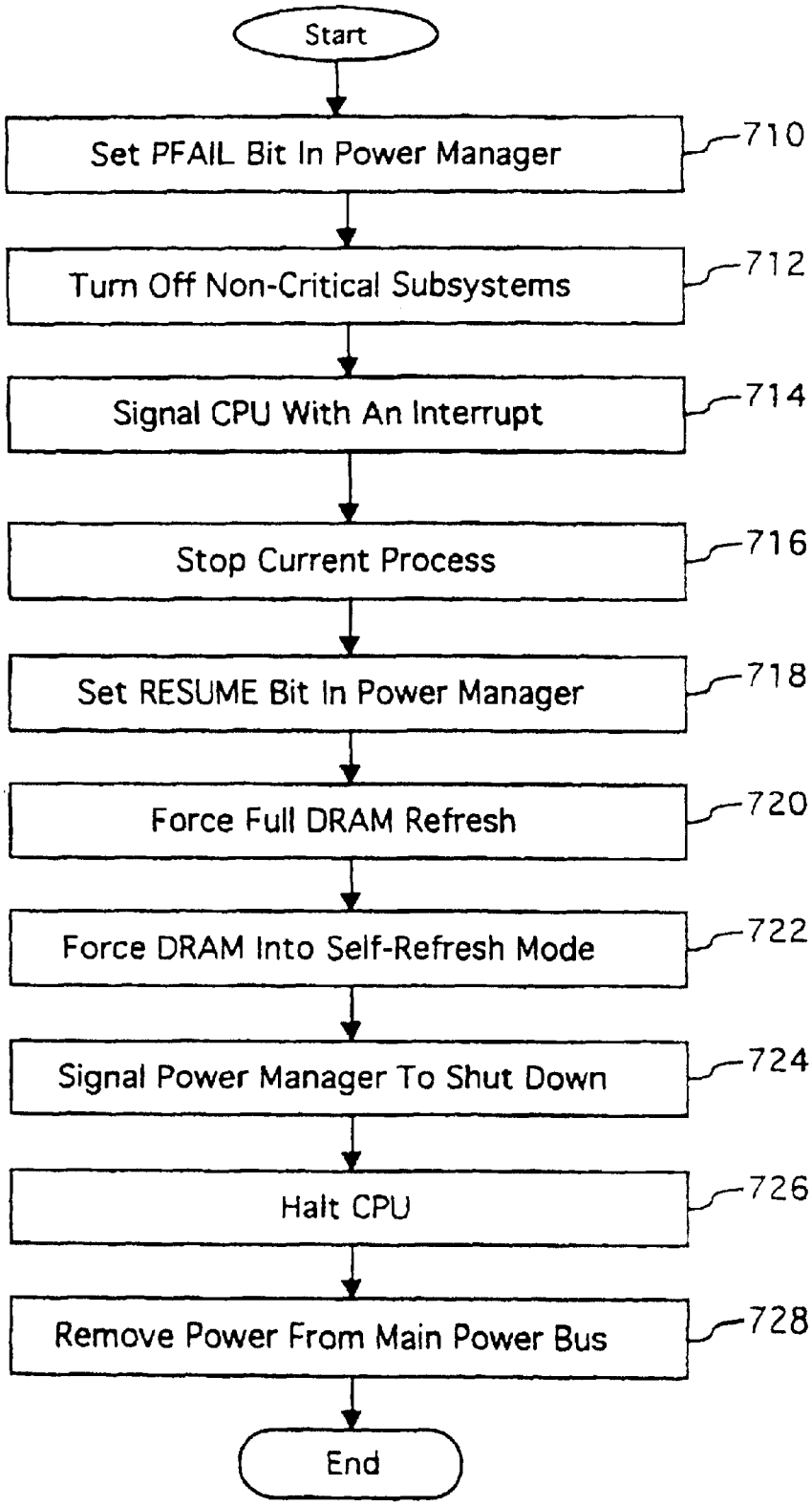
FIG. 7 is a flowchart of preferred method steps for performing a powerfail powerdown sequence according to the present invention.

Referring now to FIG. 7, a flowchart of preferred method steps for performing a powerfail powerdown sequence according to the present invention is shown. Initially, power manager 342 sets 710 a PFAIL bit which records the occurrence of a power failure so that computer 118 software routines may subsequently access this information when needed. Next, power manager 342 turns off 712 all non-critical subsystems. Power manager 342 then signals 714 CPU 344 with an interrupt and CPU 344 responsively stops 716 the current process.

Next, CPU 344 sets 718 the RESUME bit in power manager 342 to indicate that CPU 344 should not be reset in a subsequent powerup of camera 110. CPU 344 then forces 720 a full refresh of DRAM 346 and then forces 722 DRAM 346 into a self-refresh mode. Next, CPU 344 signals 724 power manager 342 to shut down and then CPU 344 halts 726 operation. After halting, CPU 344 still receives operating power from backup batteries 360 and is essentially stopped "in place." In this static mode, system bus 116 is in a tri-state condition and the CPU 344 clock is stopped. All CPU 344 states, however, are still intact (for example, the registers, program counter, cache and stack are preserved intact) and image data in DRAM 346 is also preserved intact. Next, power manager 342 removes 728 operating power from main power bus 362. The FIG. 7 powerfail powerdown sequence is then complete.

Figure 8:
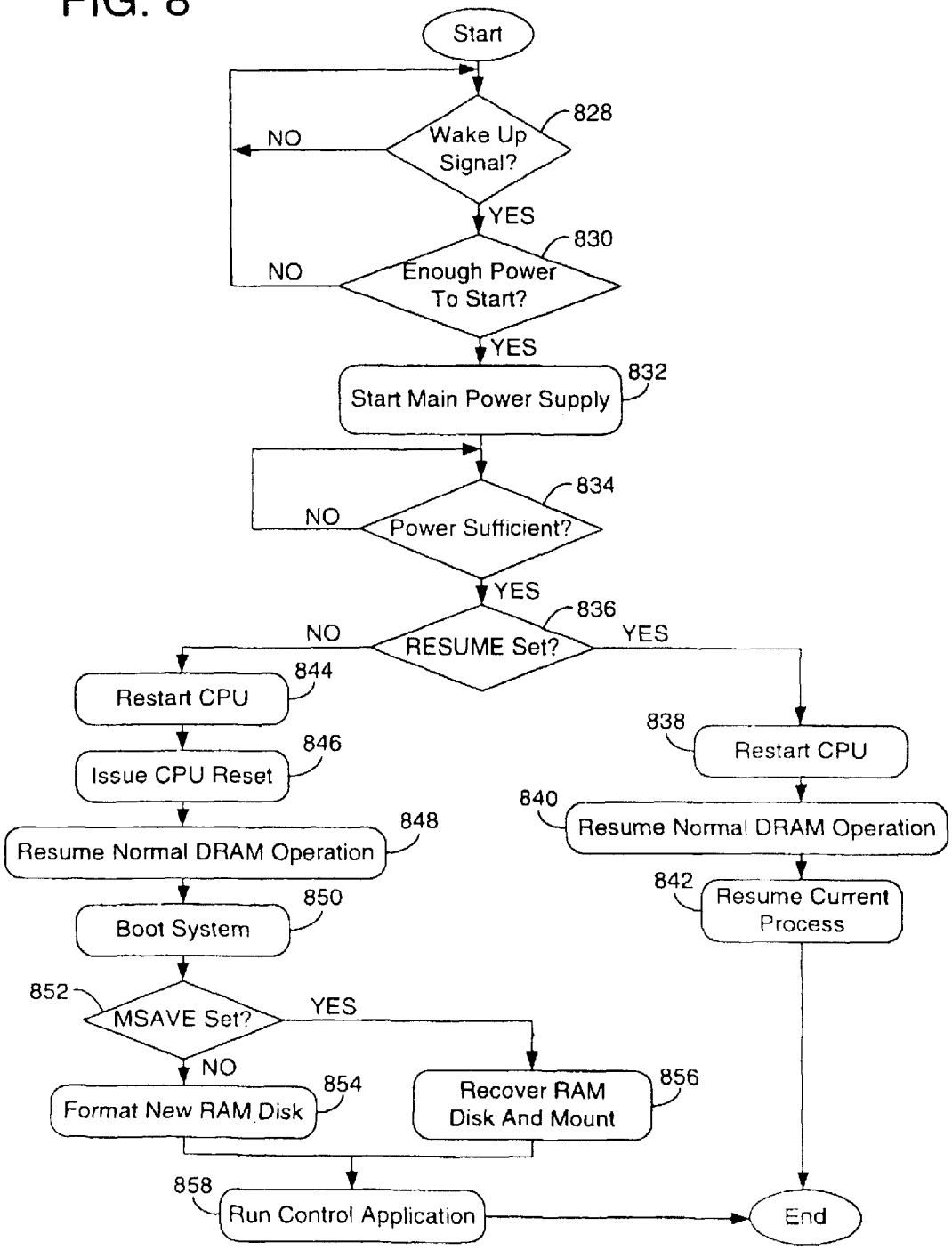
FIG. 8 is a flowchart of preferred method steps for performing a resume/restart sequence according to the present invention.

Referring now to FIG. 8, a flowchart of preferred method steps for performing a restart/resume sequence according to the present invention is shown. Initially, CPU 344 waits 828 for a "wake up" signal which is typically generated in response to the activation of a camera 110 power on-off switch. After the "wake up" signal is generated, power manager 342 determines 830 whether power supply 356 is generating enough operating power to start camera 110. If sufficient operating power is present, power manager 342 starts 832 power supply 356 in normal mode with the main batteries 358 providing operating power to power supply 356 which then responsively provides the operating power to main power bus 362 and also to secondary power bus 364. Next, power manager 342 determines 834 whether the generated operating power is maintaining a sufficient voltage level.

If operating power is sufficient in camera 110, power manager 342 then determines 836 whether a RESUME bit has been set in power manager 342. In the preferred embodiment, CPU 344 sets the RESUME bit in response to a power failure in order to indicate that CPU 344 should not be reset in a subsequent powerup of camera 110. If the RESUME bit has been set, power manager 342 restarts 838 the CPU 344 which responsively resumes 840 normal operation of DRAM 346 and then resumes 842 the camera 110 process which was interrupted by the intervening power failure.

If the RESUME bit has not been set, then power manager 342 restarts 844 the CPU 344 and issues 846 a CPU 344 reset. CPU 344 then resumes 848 normal operation of DRAM 346 and boots 850 the computer 110 system using the system configuration 408 routine. Next, CPU 344 determines 852 whether a MSAVE bit has been set in power manager 342. In the preferred embodiment, CPU 344 sets the MSAVE bit to specify that RAM disk 532 contains image data that should be saved upon restart of computer 118. If the MSAVE bit has not been set, computer 118 formats 854 a new RAM disk 532. CPU 344 then runs 858 control application 400 for normal operation of camera 110. In step 852, if the MSAVE bit has been set, then CPU 344 recovers and mounts 856 RAM disk 532. CPU 344 then runs 858 control application 400 for normal operation of camera 110. The restart/resume process of FIG. 8 then ends.

Figure 9:
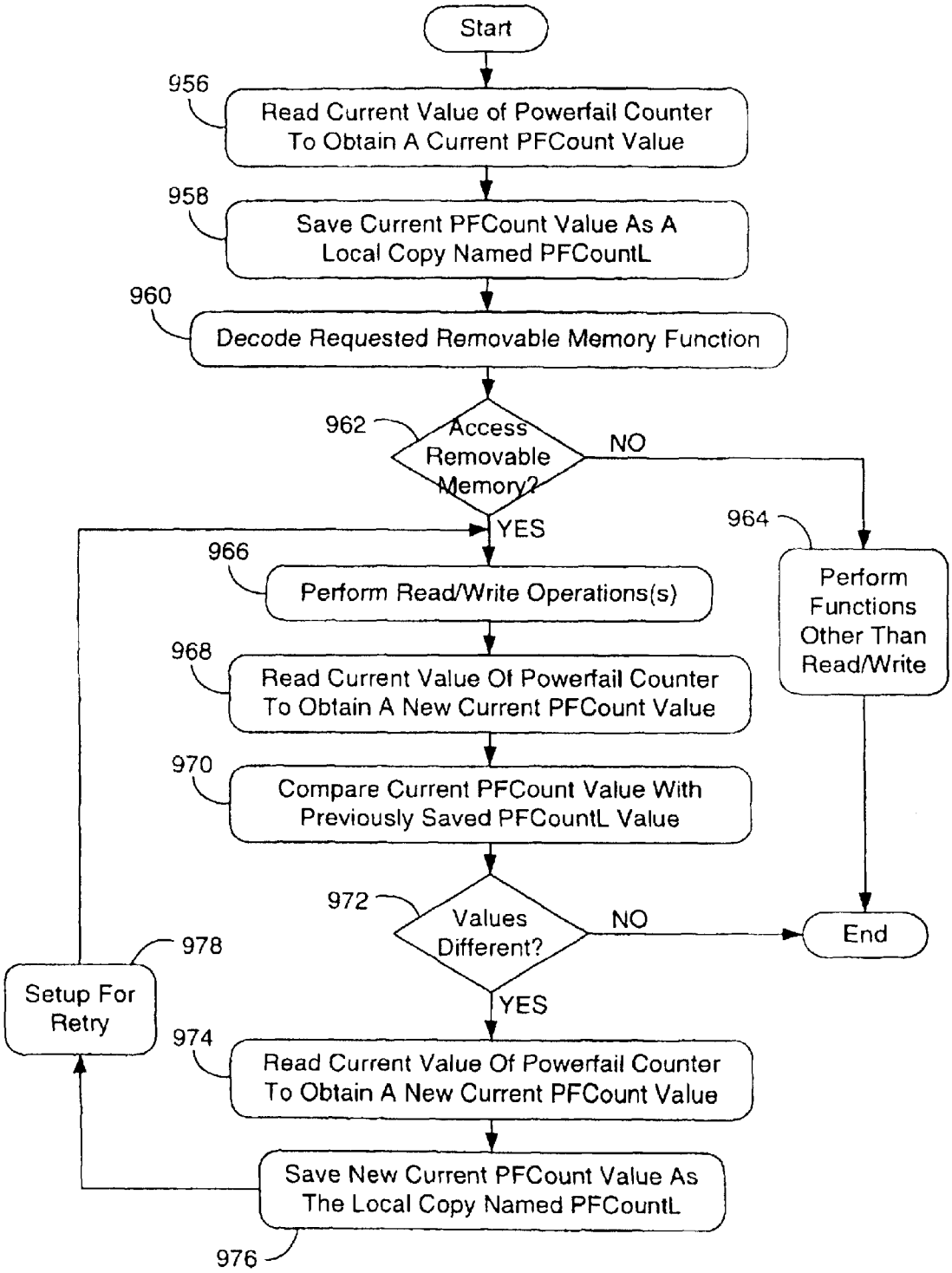
FIG. 9 is a flowchart of preferred method steps for preventing power failure damage to memory files according to the present invention.

Referring now to FIG. 9, a flowchart of preferred method steps for preventing power failure damage to the contents of removable memory 354 is shown. This FIG. 9 process may also be applied to selected other camera 110 processes or operations whose successful completion would be seriously impaired by an intervening power failure.

Initially, removable memory driver 411 reads 956 the contents of powerfail counter 347 to obtain a current PFCount value. Next, removable memory driver 411 saves 958 a local copy of the current PFCount value into Pfail CountL 540 within working memory 530. Then, removable memory driver 411 obtains and decodes 960 any existing requests to perform a function related to removable memory 411. Next, removable memory driver 411 determines 962 whether the requested driver 411 function requires accessing removable memory 354 to perform a memory input/output function, such as a read/write operation.

If the requested memory function foes not require an access of removable memory 354, then removable memory driver 411 performs 964 these non-read/write functions and the FIG. 9 process ends. However, if the requested memory function involves an input/output operation to move information to or from removable memory 354, then removable memory driver 411 performs 966 the read/write operation(s) as requested. These operations typically include the complementary steps of sending an input/output command and any related data to removable memory 354 and subsequently receiving a corresponding response from removable memory 354.

After removable memory driver 411 has performed the requested read/write operation, then removable memory driver 411 reads 968 the current value in powerfail counter 347 to obtain a new current PFCount value. Next, removable memory driver 411 compares 970 the new current PFCount value (step 968) and the previously-saved PFCountL 540 value (step 958). Removable memory driver 411 determines 972 whether the new current PFCount value and the previously-saved PFCountL 540 value are different.

If the new current PFCount value and the previously-saved PFCountL value are not different, then the read/write operation to removable memory 354 was not interrupted by an intervening power failure and removable memory driver 411 has successfully performed the read/write function as requested. The FIG. 9 process therefore ends. If, however, the new current PFCount value and the previously-saved PFCountL value are different (step 972), then the read/write operation has been interrupted by an intervening power failure within camera 110.

If a power failure has intervened, then removable memory driver 411 reads 974 the current contents of powerfail counter 347 to obtain a new current PFCount value and also saves 976 a local copy of the new current PFCount value into Pfail CountL 540 within working memory 530. In other embodiments, removable memory driver 411 may alternatively store the new current PFCount value obtained in step 968 into Pfail CountL 540, providing that the step 970 comparison process does not alter or destroy the step 968 PFCount value. Removable memory driver 411 then sets up 978 removable memory 354 for a retry of the requested read/write operation. For example, removable memory driver 411 may issue a reset command to removable memory 354 prior to a retry of the read/write operation. The FIG. 9 process then loops back to step 966 to retry the read/write operation. Steps 966 through 978 preferably repeat until the new current PFCount value and the previously-saved PFCountL value (step 972) are equal. The FIG. 9 process may then terminate, because the requested read/write operation has been successfully completed without any intervening power failures.

The invention has been explained above with reference to a preferred embodiment. Other embodiments will be apparent to those skilled in the art in light of this disclosure. For example, the powerfail counter 347 of the present invention may be used to record occurrences within computer 118 other than the power failure discussed above in the preferred embodiment. Furthermore, the present invention may readily be applied to devices other than the removable memory 354 discussed in the preferred embodiment. Therefore, these and other variations upon the preferred embodiment are intended to be covered by the present invention, which is limited only by the appended claims.

What is claimed is:

1. A system for preventing damage to media files within a digital camera, comprising:

a power manager for detecting a power failure in said digital camera;

an interrupt handler for responsively incrementing a powerfail counter for incrementally recording the number of instances of power failure following said power failure; and a memory driver for performing a memory access operation and subsequently evaluating said powerfail counter to determine whether said power failure occurred during said memory access operation;

said memory driver repeating said memory access operation whenever said memory driver determines that said power failure occurred during said memory access operation.

2. The system of claim 1 wherein said memory driver:

evaluates said powerfail counter prior to performing said memory access operation to obtain a pre-operation value;

evaluates said powerfail counter subsequent to performing said memory access operation to obtain a post-operation value;

compares said pre-operation value and said post-operation value; and repeats said memory access operation if said memory driver determines that said pre-operation value and said post-operation value are different.

3. The system of claim 1 wherein said interrupt handler registers selected service routines and transmits a notification of said power failure to said registered service routines.

4. The system of claim 1 wherein a processor performs a powerdown sequence to preserve said media files within said digital camera when a power failure is detected.

5. The system of claim 1 further comprising a voltage sensor for monitoring a power supply to provide said power manager with the power supply voltage value.

6. A method for preventing damage to media files within a digital camera, comprising the steps of:

detecting a power failure within said digital camera;

incrementing a powerfail counter for incrementally recording the number of instances of power failure in response to said power failure;

evaluating said powerfail counter before and after performing a memory access operation to determine whether said power failure occurred during said memory access operation; and repeating said memory access operation whenever said evaluating step determines that said power failure occurred during said memory access operation.

7. The method of claim 6 wherein the steps of evaluating and repeating further include the steps of:

evaluating said powerfail counter prior to performing said memory access operation to obtain a pre-operation value;

evaluating said powerfail counter subsequent to performing said memory access operation to obtain a post-operation value;

comparing said pre-operation value and said post-operation value; and repeating said memory access operation if said memory driver determines that said pre-operation value and said post-operation value are different.

8. The method of claim 6 further comprising the steps of registering service routines and transmitting a notification of said power failure to said registered service routines using an interrupt handler.

9. The method of claim 6 further comprising the steps of performing a powerdown sequence to preserve said media files within said digital camera when a power failure is detected, whereby data within said digital camera is protected.

10. The method of claim 6 further comprising the steps of monitoring a power supply and responsively providing the power supply voltage value using a voltage sensor.

11. A computer-readable medium comprising program instructions for preventing damage to media files within a digital camera by performing the steps of:

detecting a power failure within said digital camera;

incrementing a powerfail counter for incrementally recording the number of instances of power failure in response to said power failure;

evaluating said powerfail counter before and after performing a memory access operation to determine whether said power failure occurred during said memory access operation; and repeating said memory access operation whenever said evaluating step determines that said power failure occurred during said memory access operation.

12. The computer-readable medium of claim 11 wherein the steps of evaluating and repeating further include the steps of:

evaluating said powerfail counter prior to performing said memory access operation to obtain a pre-operation value;

evaluating said powerfail counter subsequent to performing said memory access operation to obtain a post-operation value;

comparing said pre-operation value and said post-operation value; and repeating said memory access operation if said memory driver determines that said pre-operation value and said post-operation value are different.

13. The computer-readable medium of claim 11 further comprising the steps of registering service routines and transmitting a notification of said power failure to said registered service routines using a interrupt handler.

14. The computer-readable medium of claim 11 further comprising the steps of performing a powerdown sequence and a subsequent restart sequence after detecting said power failure, whereby said media files within said digital camera are protected.

15. The computer-readable medium of claim 11 further comprising the steps of monitoring a power supply and responsively providing the power supply voltage value using a voltage sensor.

16. A system for preventing damage to media files within a digital camera, comprising:

means for detecting a power failure within said digital camera;

means for incrementing a powerfail counter for incrementally recording instances of power failure in response to said power failure;

means for evaluating said powerfail counter before and after performing a memory access operation to determine whether said power failure occurred during said memory access operation; and means for repeating said memory access operation whenever said means for evaluating determines that said power failure occurred during said memory access operation.

17. The system of claim 16 wherein said means for evaluating and repeating further include means for:

evaluating said powerfail counter prior to performing said memory access operation to obtain a pre-operation value;

evaluating said powerfail counter subsequent to performing said memory access operation to obtain a post-operation value; comparing said pre-operation value and said post-operation value; and repeating said memory access operation if said memory driver determines that said pre-operation value and said post-operation value are different.

18. The system of claim 16 further comprising means for registering service routines and transmitting a notification of said power failure to said means for registering service routines.

19. The system of claim 16 further comprising the means for performing a powerdown sequence and a subsequent restart sequence after detecting said power failure, whereby said media files within said digital camera are protected.

20. The system of claim 16 further comprising means for monitoring a power supply and responsively providing the power supply voltage value using a voltage sensor.

*21. A computer system for preventing damage to media files within a digital image capture device, comprising:*

*a power supply connected to a main battery and a backup battery in the digital image capture device;*

*a sensor for detecting a power loss in the main battery;*

*an interrupt handler for responsively incrementing a powerfail counter for incrementally recording the number of instances of power loss following the detected power loss; and*

*a processor coupled to the sensor for performing memory access operations, responsive to determining that the sensor detected a power loss during a memory access operation, the processor configured to repeat the memory access operation using power from the backup battery.*

*22. The system of claim 21, wherein the processor determines that the sensor detected a power loss by evaluating the counter.*

*23. The system of claim 21, wherein the processor performs a powerdown sequence in response to determining that the sensor detected a power loss to preserve the media files within the digital image capture device.*

*24. The computer system of claim 21, wherein the power supply further comprises a flywheel capacitor connected to the main battery, wherein the flywheel capacitor temporarily maintains the voltage from the main battery in response to undetected power failure in the main battery.*

*25. A computer method of preventing damage to media files within a digital image capture device, the method comprising:*

*detecting a power loss in a main battery of a power supply during a memory access operation to a media file, wherein the power supply is connected to the main battery and a backup battery in the digital image capture device;*

*responsively incrementing a powerfail counter for incrementally recording the number of instances of power loss following the detected power loss; and*

*responsive to the detected power loss during the memory access operation, repeating the memory access operation to the media file using power from the backup battery by the computer processor.*

*26. The method of claim 25, further comprising determining by the computer processor if the power loss occurred during a memory access operation by evaluating a counter.*

*27. The method of claim 25, further comprising performing a powerdown sequence by the computer processor to preserve the media files within the digital image capture device.*

*28. The computer method of claim 25, wherein the power supply further comprises a flywheel capacitor connected to the main battery, wherein the flywheel capacitor temporarily*

*maintains the voltage from the main battery in response to undetected power failure in the main battery.*

*29. A computer-readable medium having stored thereon instructions which, when executed by a processor in a system for preventing damage to media files within a digital image capture device, cause the processor to perform the operations of:*

*detecting a power loss in a main battery of a power supply during a memory access operation to a media file, wherein the power supply is connected to the main battery and a backup battery in the digital image capture device;*

*responsively incrementing a powerfail counter for incrementally recording the number of instances of power loss following the detected power loss; and*

*responsive to the detected power loss during the memory access operation, repeating the memory access operation to the media file using power from the backup battery.*

*30. The computer-readable medium of claim 29, further comprising determining if the power loss occurred during a memory access operation by evaluating a counter.*

*31. The computer-readable medium of claim 29, further comprising performing a powerdown sequence to preserve the media files within the digital image capture device.*

*32. The computer-readable medium of claim 29, wherein the power supply further comprises a flywheel capacitor connected to the main battery, wherein the flywheel capacitor temporarily maintains the voltage from the main battery in response to undetected power failure in the main battery.*

* * * * *